United States Patent
Raitola et al.

(10) Patent No.: US 6,445,757 B1
(45) Date of Patent: *Sep. 3, 2002

(54) DIVERSITY COMBINING METHOD, AND RECEIVER

(75) Inventors: Mika Raitola, Masala; Harri Jokinen, Hiisi; Pekka Ranta, Nummela, all of (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 09/242,405

(22) PCT Filed: Aug. 15, 1997

(86) PCT No.: PCT/FI97/00479

§ 371 (c)(1),
(2), (4) Date: Jun. 3, 1999

(87) PCT Pub. No.: WO98/07243

PCT Pub. Date: Feb. 19, 1998

(30) Foreign Application Priority Data

Aug. 15, 1996 (FI) .................................................. 963203

(51) Int. Cl.[7] .................................................. H04B 7/12
(52) U.S. Cl. ........................ 375/347; 375/348; 375/349; 375/341; 375/262; 375/267; 455/504; 455/517; 455/63
(58) Field of Search ................................. 375/259, 262, 375/267, 147, 152, 148, 340, 341, 346, 347, 348, 349; 455/67.1, 67.3, 63, 422, 513, 504, 506, 517

(56) References Cited

U.S. PATENT DOCUMENTS

| 5,199,047 A | 3/1993 | Koch |
| 5,297,171 A | 3/1994 | Koch |
| 5,553,102 A | 9/1996 | Jasper et al. |
| 6,192,238 B1 * | 2/2001 | Piirainen .................... 455/422 |

FOREIGN PATENT DOCUMENTS

| EP | 0 490 427 A3 | 6/1992 |
| EP | 0 716 513 A1 | 6/1996 |
| WO | WO 92/08298 | 5/1992 |
| WO | WO97/08841 | 3/1997 |

OTHER PUBLICATIONS

Asztély, D., "On Antenna Arrays in Mobile Communication Systems, Fast Fading and GSM Base Station Receiver Algorithms", IR–S3–SB–9611, Royal Institute of Technology, pp. 1–73 (Mar. 1996).

Bottomley, et al., "Adaptive Arrays and MLSE Equalization", IEEE, pp. 50–54, (1995).

International Search Report for PCT/FI97/00479.

"Dallas Globecom' 89—IEEE Global Telecommunications Conference & Exhibition" Nov. 27–30, 1989 "Communications Technology f or the 1990s and Beyond".

"Combining Technology," Chapter 10. *Mobile Communications Engineering*. pp. 291–336.

* cited by examiner

Primary Examiner—Chi Pham
Assistant Examiner—Khanh Cong Tran
(74) Attorney, Agent, or Firm—Altera Law Group, LLC

(57) ABSTRACT

The invention relates to a diversity combining method and to a receiver. In diversity combining, outputs (33) of a matched filter (25) of each branch are weighted with a quality estimate (32) which is generated in quality means (28b) in such a matter that the quality estimate (30) is proportional to the inverse of the interference strength (31) of the signal. The strength (31) of signal interference is generated in interference means (28c) e.g. in variance-like fashion from the differences between a reference signal (30) generated in reference signal means (28a) as the convolution of the estimated channel impulse response and the predetermined sequence and a signal received from the channel.

10 Claims, 2 Drawing Sheets

DIVERSITY COMBINING METHOD, AND RECEIVER

Figure 1:
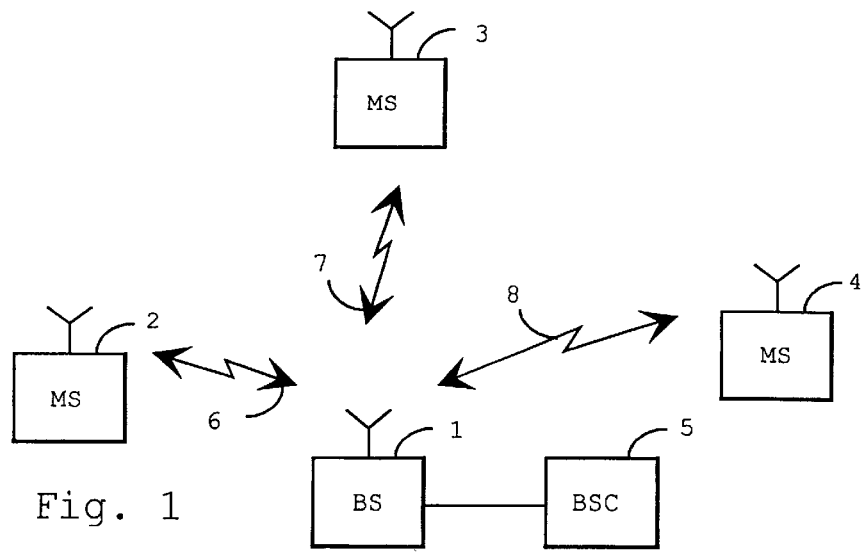

The invention relates to a diversity combining method in a digital radio system receiver, in which receiver matched filtering and maximum likelihood detection are used and an estimated channel impulse response and autocorrelation taps of the impulse response are generated, and in which radio system substantially all signal processing occurs as symbols and a desired signal comprises a predetermined sequence.

The invention also relates to a receiver in a digital radio system, the receiver comprising a matched filter, diversity branches and a maximum likelihood detector, the receiver being arranged to generate an estimated channel impulse response and autocorrelation taps of the impulse response, and in which radio system a desired signal comprises a predetermined sequence and in which radio system signal processing is arranged to occur as symbols.

In a radio system the quality of the connection between a base station and a subscriber terminal varies continuously. This variation is due to interfering factors on the radio path and to attenuation of the radio waves as a function of distance and time in a fading channel. Connection quality can be measured for example by observing the received power. Variance in connection quality can partly be compensated by power regulation.

However, in a digital radio system a more precise method than power measuring is needed for estimating connection quality. Then the known quality parameters are for example the bit error rate (BER) and the signal-to-noise ratio.

It is previously known to utilize decisions of the ML (Maximum Likelihood) type detection for estimating the signal-to-noise ratio of a received signal. Thus a Viterbi detector usually functions as the ML detector and a base station or subscriber terminal can be the receiver. In known solutions the Viterbi detection is performed on the received burst in full before determining the signal-to-noise ratio. However, as a Viterbi algorithm is often a too demanding measure for a digital signal processing program to perform during the processing time allowed by the receiver, separate Viterbi hardware has to be used. This has been described in greater detail in J. Hagenauer, P. Hoeher: A Viterbi Algorithm with Soft-decision Outputs and its Applications, IEEE GLOBECOM 1989, Dallas, Tex., November 1989, which is incorporated herein by reference.

It is known that a signal quality estimate, often the signal-to-noise ratio, is needed when using different diversity receivers. In diversity reception the most common diversity receivers combine the signals before or after detection and comprise e.g. selective combining, maximal-ratio combining and equal-gain combining. The diversity signals are usually detected using a Viterbi detector, the signals being combined after detection. However, it is preferable to combine the signals before detection, thus achieving a greater amplification of the signal. Diversity receivers have been described in greater detail for example in the book William C. Y. Lee: Mobile Communications Engineering, chapter 10, Combining technology, pages 291–336, McGraw-Hill, USA, 1982, which is incorporated herein by reference.

An object of the present invention is to implement a method for estimating the interference strength directly from a received signal without the help of ML detection and simultaneously enabling the combination of diversity signals before detection when using diversity receivers.

This is achieved with the method set forth in the preamble characterized in that a reference signal is generated from the estimated channel impulse response and the predetermined sequence by convolution; an interference strength connected to the desired signal is generated using the differences of the reference signal and the predetermined sequence received from the channel; a strength value of the desired signal is generated, whereby a quality estimate is generated by dividing the strength value of the desired signal by the interference strength of the desired signal; and diversity combining is performed in such a manner that the symbols of the different branches corresponding with each other in the time domain are combined, and the outputs of the matched filters of each branch and the autocorrelation taps of the impulse response are weighted with the quality estimate of each branch.

The receiver of the invention is characterized in that the receiver comprises reference signal means for generating a reference signal from the estimated channel impulse response and the predetermined sequence by convolution; interference means for generating the interference strength associated with the desired signal using the differences of the reference signal and the predetermined sequence received from the channel; the receiver is arranged to generate a strength value of the desired signal and quality means are arranged to generate a quality estimate by dividing the strength value of the desired signal by the interference strength of the desired signal; and combining means of the diversity branches combine the symbols of the different branches corresponding to each other in the time domain, and that the receiver is arranged to weight the matched filter outputs of each branch and the autocorrelation taps of the impulse response with the quality estimate of each branch.

Great advantages are achieved with the invention. With the method of the invention the interference strength can be estimated directly from the received signal without performing a Viterbi detection. By avoiding the use of the Viterbi algorithm usually applied to the ML method memory and time used for calculating are saved. The generated interference strength can be utilized for estimating the status of the channel, as help in methods of estimating bad frames and for scaling the ML metric. Furthermore, the interference strength can be utilized for diversity combining and it is particularly useful when multipath signals are combined before detection.

Figure 2:
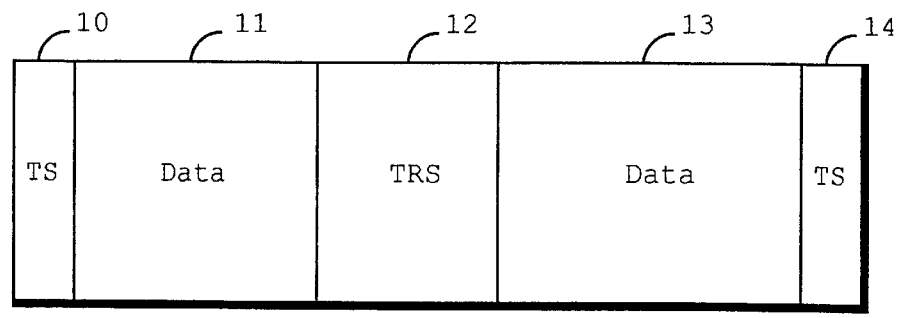
Figure 3:
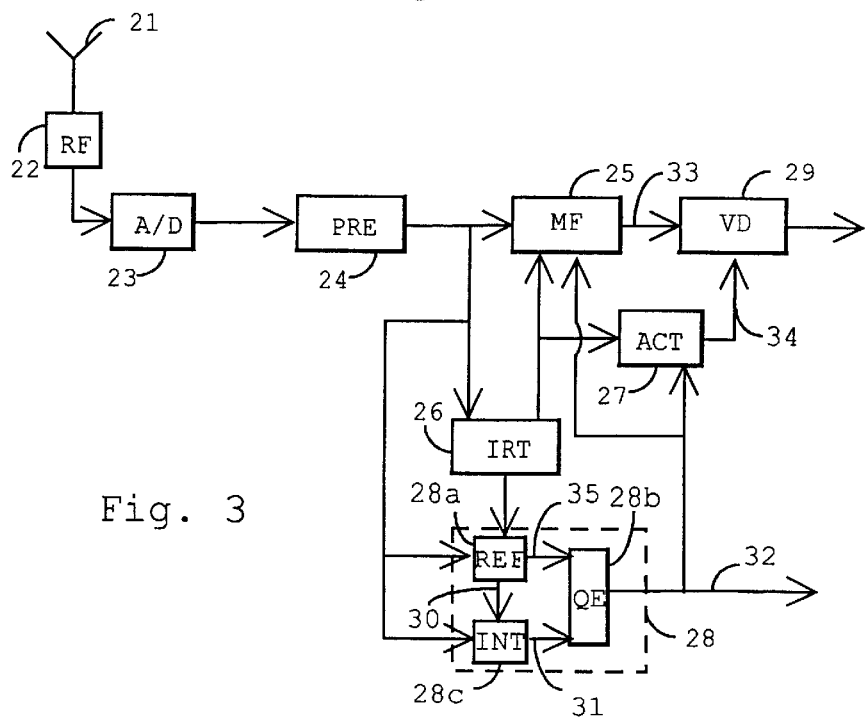
Figure 4:
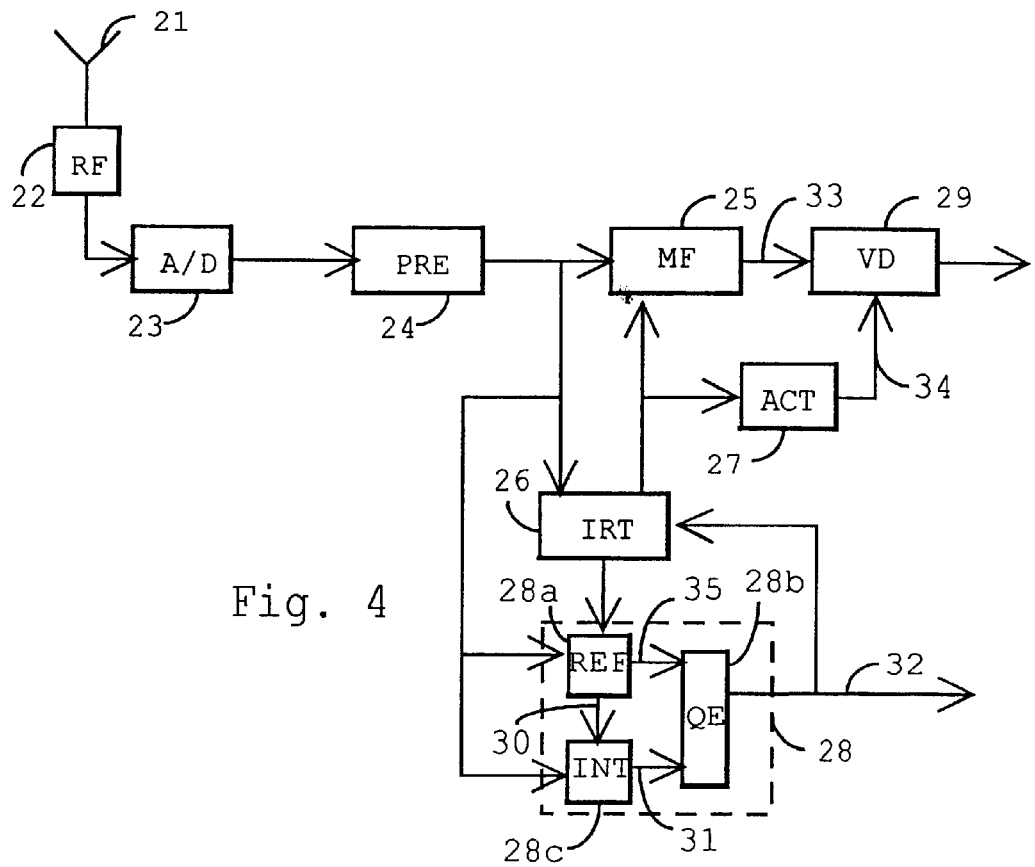
Figure 5:
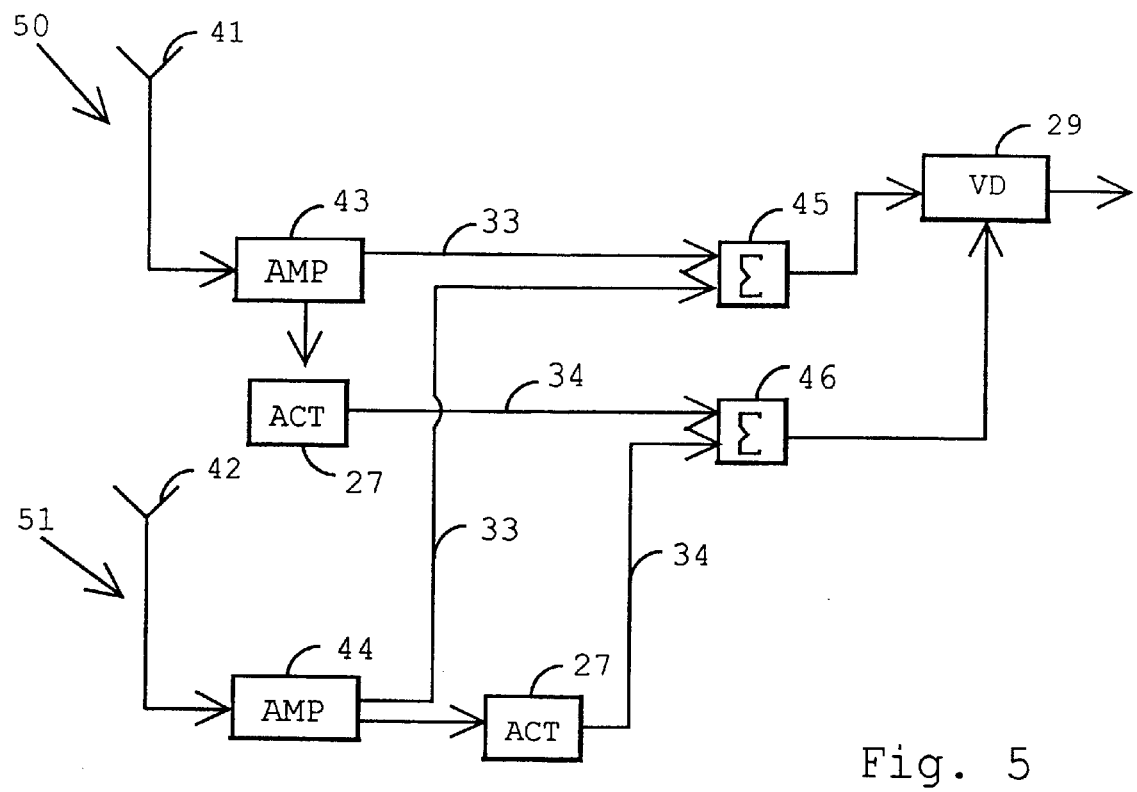

In the following, the invention will be described in greater detail with reference to examples in the accompanying drawings, in which FIG. 1 shows a radio system, FIG. 2 shows a normal burst of the GSM system, FIG. 3 shows a block diagram of the receiver, FIG. 4 shows a block diagram of the receiver and FIG. 5 shows a receiver using a diversity combining technique.

The method and the receiver of the invention can be applied to the GSM radio system (Global System for Mobile communication) without restricting it thereto. In FIG. 1 the radio system comprises base station 1, and a number of generally moving subscriber terminals 2–4 having bi-directional connections 6–8 with the base station. Base station 1 transmits the connections of terminals 2–4 to base station controller 5 which transmits them further to other parts of the system and if necessary to a fixed network. Base station controller 5 controls the function of one or several base stations 1. In the GSM system both base station 1 and terminals 2–4 constantly measure connection quality.

Let us now examine in more detail the solution of the invention in the GSM system. A normal burst of the GSM system is shown in FIG. 2, the burst comprising 148 symbols in all. The symbols comprise bits and bit combinations. The symbols of the burst are arranged in sequences comprising 3 start symbols (TS) 10, 58 data symbols (Data) 11, 26 training symbols (TRS) 12, 58 data symbols (Data) 13 and 3 end symbols (TS) 14. In the solution of the invention the symbol sequence of the reference signal is calculated as the function of training sequence 12 and of the estimated channel impulse response, preferably being the convolution of said sequences. The generation of convolution function h(t) can be shown in the following way between functions f(t) and g(t) in its general form:

$$h(t) = (f * g)(t) = \int_0^t f(\tau)g(t-\tau)d\tau. \quad (1)$$

In the following, one method of the invention is described when applying it to the GSM system in particular. The calculation of the channel's momentary quality estimate QE comprises two essential steps: firstly the generation of reference signal YR from estimated channel impulse response H and training sequence TRS (training symbols 12 in FIG. 2) preferably as a convolution and secondly the generation of the interference strength for example as interference energy VAR from reference signal YR and training sequence Y received from the channel in a variance-like fashion. By calculating the convolution such an advantage is achieved that reference signal YR is generated in the same way as the actual signal on the channel and by comparing this result with the desired signal received from the channel the interference strength can be estimated. Variance VAR is generally calculated for the discreet distribution in the following way:

$$\delta^2 = \text{VAR} = \sum_j (x_j - \mu)^2 f(x_j), \quad (2)$$

where $\mu$ is an expected value. The interference strength can also be determined for example in a standard deviation-like fashion. Standard deviation $\delta$ is according to its definition the positive square root of variance $\delta^2$. Furthermore, quadratic difference $(x_j - \mu)^2$ can in the method of the invention be replaced by any exponent $|x_j - \mu|^z$ of the absolute value of the difference where z is any real number. When interference strength VAR is calculated from reference signal YR and from the signal received from the channel in a variance type fashion, such an advantage is achieved that the result obtained is directly the effective value of the interference.

As training sequence TRS is predetermined it is possible to determine momentary estimated channel impulse response H. Usually estimated impulse response H has 5 symbols i.e. N=5 is valid for the number of symbols N. In the first step of the method of the invention reference signal YR, which is the expected value of received training sequence TRS with said estimated impulse response H, is calculated e.g. according to formula (3) as the convolution of estimated channel impulse response H and training sequence TRS.

$$YR(j) = \sum_{i=0}^{N-1} HU(i) \cdot (1 - 2 \cdot TRS(j-i)) \quad (3)$$

where N is the number of symbols in estimated impulse response H and $j \geq N$ is valid for symbol index j which shows the symbol to be calculated. Entire reference signal YR is obtained by going through the symbols j between N and 26 or the number of symbols in a predetermined sequence. Using obtained reference signal YR and received signal Y comprising the training sequence, their variance-type interference strength VAR is calculated for example by using formula (4).

$$VAR = \frac{\sum_{i=N}^{26} Re(Y(i + \text{offset}) - YR(i))^2 + \text{Im}(Y(i + \text{offset}) - YR(i))^2}{K} \quad (4)$$

The maximum number of symbols taken into account in formula (4) is the number of symbols of predetermined sequence 12 less the number of symbols in the estimated channel impulse response. Then the number of symbols considered in the calculation can be freely chosen. Interference strength VAR is thus calculated as variance, but number K in its nominator is not significant, as the nominator simply has to be formed and it only functions as the scalar of the interference strength. This is easy to observe and to correct in any step of generating the quality estimate. In formula (4) the value of variance-type result VAR is the same as the interference energy per sample if the number of symbols used in summing is set as the value of divisor K, or the energy per entire sequence if the value of divisor K is one. In formula (4) I/Q modulation markings are used the symbols being shown in their complex mode. An offset is also observed in formula (4) i.e. it is preferable to transfer the symbols of the received signal in such a manner that the symbol of the received signal corresponds with the symbol of the reference signal.

The strength value E of the received desired signal, which value can be the amplitudinal strength of the symbols to be considered in the summing or the effective value or another corresponding exponent of the symbol's amplitude, can be calculated either using the estimated channel impulse response H, using reference signal YR or using the desired signal received from the channel. The advantage of calculating the effective value of the taps of estimated channel impulse response H is that energy E of the signal is obtained per symbol. When energy E is calculated using the complex symbols of the I/Q modulation of the reference signal e.g. using formula (5)

$$E = \sum_{i=N}^{26} Re(YR(i))^2 + \text{Im}(YR(i))^2 \quad (5)$$

the entire energy of the reference signal is obtained directly. The energy of the signal received from the channel can be calculated similarly. If the normalized average energy of the signal corresponding to energy E, is formed by preprocessing means 24 according to prior art, it does not have to be separately calculated. The strength value of the desired signal is directly calculated from the desired signal as in formula (5), but the symbols of reference signal YR are replaced with the symbols of desired signal Y.

Momentary channel quality estimate QE is preferably obtained by forming the inverse of the interference strength as shown in formula (6)

$$QE = \frac{1}{\text{VAR}}. \quad (6)$$

Quality estimate QE can also be formed as shown in formula (7) by way of principle by dividing signal energy per symbol E by noise energy per symbol VAR when the number of symbols is used as the value of divisor K in formula (4).

$$QE = \frac{E}{VAR} \quad (7)$$

Another preferable way of calculating quality estimate QE according to formula (7) is to divide entire signal energy E by entire noise energy VAR, when the value of divisor K in formula (4) is one, and to avoid unnecessary dividing as formulas (4) and (5) comprise in this case a substantially equal amount of elements to be summed. When the receiver comprises several diversity branches, the signal components of the different diversity branches and the autocorrelation taps of the estimated impulse response are weighted with quality estimate QE of each branch. The weighting preferably occurs by multiplying the signal components in the matched filter by the autocorrelation taps of the estimated impulse response as they are being generated.

Quality estimate QE is preferably calculated separately for each burst as the connection quality differs greatly even during a short time.

Let us now examine in greater detail the receiver of the cellular radio system of the invention, the block diagram of which is shown with essential parts in FIG. 3. Both a base station and a subscriber terminal can function as the receiver of the invention. The receiver comprises antenna 21 for conveying a received desired signal to radio frequency parts 22 in which the signal is converted into an intermediate frequency. From the radio frequency parts the signal is conveyed into conversion means 23 in which the signal is converted from analog into digital form. The digital signal propagates to preprocessing means 24 where the signal can e.g. be filtered, a DC offset can be removed from it, an automatic amplification of the digital signal can be controlled and the signal can be demodulated. Filter 25 matched to the channel restores the signal distorted on the channel to the original data flow with a low symbol error probability. The channel impulse response estimate and its effective value are generated by means 26. Autocorrelation taps 34 of the estimated channel impulse response are generated from the impulse response information using means 27.

In the digital radio system the channel impulse response is described with a number comprising N symbols. The channel impulse response usually comprises five symbols, i.e. N obtains the value 5. Quality estimate 32 (QE) is calculated with the method of the invention using means 28 comprising means 28a, 28b and 28c. Reference signal means 28a are used for generating reference signal 30 (YR) from the estimated channel impulse response and the predetermined sequence comprised in the signal. Interference means 28b generate interference strength 31 from the difference between reference signal YR and the received predetermined sequence. Quality means 28c generate quality estimate QE of the connection of the invention in such a manner that the quality estimate is reversed proportional to the interference connected to the desired signal. The receiver is also arranged to correct the offset, or the signal, of reference signal 30 and the predetermined sequence, i.e. the transfer in time of the symbols in relation to one another caused by propagation delay. Finally ML detection means 29 of the receiver, preferably a Viterbi detector, receive output 33 of matched filter 25 i.e. the different sequences of the received burst shown in FIG. 2 and autocorrelation taps 34 of the channel impulse response from means 27. In this receiver solution both autocorrelation taps 34 of the impulse response in means 27 and the desired signal in matched filter 25 are weighted by quality estimate QE. The detected symbols are the output of ML detection means 29.

Let us now examine in greater detail a second radio system receiver of the invention as an alternative to the first, the block diagram of which is shown with essential parts in FIG. 4. The receiver is, to a very large extent, similar to the receiver in FIG. 3. In this receiver solution quality estimate 32 (QE) is transferred from quality means 28c to means 26, which generates an impulse response weighted by quality estimate QE, whereby quality estimate QE affects output 33 of matched filter 25 and weights the desired signal being processed. The detected symbols are the output of ML detection means 29.

The solutions shown in FIGS. 3 and 4 can preferably be utilized in multipath reception, FIG. 5 showing such an arrangement, when the receiver uses diversity combining. The receiver in FIG. 5 comprises two diversity branches 50, 51, both of which comprising antenna 41 and 42, means 43 and 44, which in turn comprise e.g. radio frequency parts 22, conversion means 23, preprocessing means 24, matched filters 25, channel impulse response estimation means 26, calculation means 28 of the quality estimate, as do the receivers in FIGS. 3 and 4. Although FIG. 5 shows only two diversity branches, or channels, 50, 51, similar diversity combining can also be applied to several channels. Estimated impulse response autocorrelation taps 34 of the different channels are generated by means 27, which represent the same function as means 27 of FIGS. 3 and 4. The signal components arriving from different channels, and that are outputs 33 of matched filter 25, are combined by means 45 where the combining is performed e.g. by summing or averaging and when so desired by multiplying the signals by a suitable constant. In the solution of the invention the signal component of each diversity branch is weighted by quality estimate QE of the particular branch 50, 51. In a steep weighting only the best signal component or the best signal components are selected for detector 29 on the basis of quality estimate QE. After combining the signal is conveyed to ML detection means 29. Also outputs 34 of generating means 27 of the impulse response autocorrelation taps are combined by means 46 e.g. by summing or averaging and when so desired by multiplying the signals by a suitable constant. In combining diversity branches 50, 51 and autocorrelation taps 34 it is preferable to combine only the symbols or the bits that correspond with one another in time. The output of means 46 is also conveyed to ML detection means 29. Such a solution is particularly useful because a greater amplification of the signal is achieved when the signal components are combined before detection.

The solutions of the invention can be implemented particularly regarding digital signal processing with e.g. ASIC or VLSI circuits. The functions to be performed are preferably implemented as programs based on microprocessor technology.

Even though the invention has been described above with reference to the example of the accompanying drawings, it is obvious that the invention is not restricted to it but can be modified in various ways within the scope of the inventive idea disclosed in the attached claims.

What is claimed is:

1. A diversity combining method in a digital radio system receiver (1–4), in which receiver matched filtering and maximum likelihood detection are used and an estimated channel impulse response and autocorrelation taps of the impulse response are generated, and in which radio system substantially all signal processing occurs as symbols and a desired signal comprises a predetermined sequence (12), characterized in that a reference signal (30) is generated from the estimated channel impulse response and the predetermined sequence (12) by convolution;

an interference strength (31) connected to the desired signal is generated using the differences of the reference signal (30) and the predetermined sequence (12) received from the channel;

a strength value (35) of the desired signal is generated, whereby a quality estimate (32) is generated by dividing the strength value (35) of the desired signal by the interference strength (31) of the desired signal; and diversity combining is performed in such a manner that the symbols of the different branches (50, 51) corresponding with each other in the time domain are combined, and the outputs (33) of the matched filters (25) of each branch (50, 51) and the autocorrelation taps of the impulse response are weighted with the quality estimate (32) of each branch (50, 51).

2. A method as claimed in claim 1, characterized in that the diversity combining occurs before the maximum likelihood detection.

3. A method as claimed in claim 1, characterized in that the interference strength (31) associated with the desired signal is preferably generated in a variance-like or a standard deviation-like fashion from the differences between the reference signal (31) and the predetermined sequence (12) of the desired signal and the strength value (35) of the desired signal is generated as the sum, the quadratic sum or another corresponding power sum of the symbols strengths of the reference signal (30), the desired signal or the taps (34) of the estimated channel impulse response.

4. A method as claimed in claim 1, characterized in that when the transmission occurs in bursts the quality estimate (32) is calculated separately for each received burst.

5. A method as claimed in claim 1, characterized in that when the radio system is the GSM system, the predetermined sequence (12) is the training sequence of a normal burst of the GSM system.

6. A receiver (10–13) in a digital radio system, the receiver comprising a matched filter (25), diversity branches (50, 51) and a maximum likelihood detector (29), the receiver being arranged to generate an estimated channel impulse response and autocorrelation taps (34) of the impulse response, and in which radio system a desired signal comprises a predetermined sequence (12) and in which radio system signal processing is arranged to occur as symbols, characterized in that the receiver (10–13) comprises reference signal means (28*a*) for generating a reference signal (30) from the estimated channel impulse response and the predetermined sequence (12) by convolution;

interference means (28*c*) for generating the interference strength (31) associated with the desired signal using the differences of the reference signal (30) and the predetermined sequence (12) received from the channel;

the receiver is arranged to generate a strength value (35) of the desired signal and quality means (28*b*) are arranged to generate a quality estimate (32) by dividing the strength value (35) of the desired signal by the interference strength (31) of the desired signal; and combining means (45, 46) of the diversity branches (50, 51) combine the symbols of the different branches (50, 51) corresponding to each other in the time domain, and that the receiver is arranged to weight the matched filter (25) outputs (33) of each branch (50, 51) and the autocorrelation taps of the impulse response with the quality estimate of each branch (50, 51).

7. A receiver (10–13) as claimed in claim 6, characterized in that the combining means (45 and 46) of the diversity branches (50, 51) are located before the maximum likelihood detection means (29).

8. A receiver as claimed in claim 6, characterized in that the interference means (28*c*) are arranged to generate the interference strength (31) associated with the desired signal preferably in a variance-like or standard deviation-like fashion from the differences between the reference signal (30) and the predetermined sequence (12) of the desired signal and the receiver is arranged to generate the strength value (35) of the desired signal using the sum, the quadratic sum or another corresponding power sum of the symbols strengths of the reference signal (30), the desired signal or the taps (34) of the estimated channel impulse response.

9. A receiver as claimed in claim 6, characterized in that when the transmission occurs in bursts the receiver is arranged to generate the quality estimate (32) separately for each received burst.

10. A receiver as claimed in claim 6, characterized in that when the radio system is the GSM system the predetermined sequence (12) is the training sequence of a normal burst of the GSM system.

* * * * *